United States Patent

Hosokawa et al.

[11] Patent Number: 5,947,098
[45] Date of Patent: Sep. 7, 1999

[54] ENGINE CONTROL APPARATUS

[75] Inventors: Kouji Hosokawa, Higashimurayama; Kousaku Shimada, Hitachinaka, both of Japan

[73] Assignee: Hitachi, Ltd., Japan

[21] Appl. No.: 08/962,777

[22] Filed: Nov. 3, 1997

[30] Foreign Application Priority Data

Nov. 1, 1996 [JP] Japan .................................. 8-292060

[51] Int. Cl.⁶ .................................................. F02D 41/14
[52] U.S. Cl. ......................................... 123/679; 123/696
[58] Field of Search .................................. 123/679, 694, 123/695, 696; 701/109

[56] References Cited

U.S. PATENT DOCUMENTS

| | | | |
|---|---|---|---|
| 4,825,838 | 5/1989 | Osuga et al. | 123/695 X |
| 4,827,937 | 5/1989 | Kohler et al. | 123/674 X |
| 5,579,738 | 12/1996 | Frischmuth et al. | 123/497 |
| 5,771,861 | 6/1998 | Musser et al. | 123/357 |
| 5,775,304 | 7/1998 | Kono et al. | 123/497 |

FOREIGN PATENT DOCUMENTS 6-58188  3/1994  Japan .

*Primary Examiner*—Tony M. Argenbright
*Attorney, Agent, or Firm*—Evenson, McKeown, Edwards & Lenahan, P.L.L.C.

[57] ABSTRACT

An engine control apparatus in which it is possible to suppress variation of the A/F ratio due to variation of the fuel pressure and for the A/F ratio to converge in a very short time when continuous variation of the increase and decrease of the fuel pressure based on an operation state is performed in the A/F ratio control of an engine. The engine control apparatus sets a target fuel pressure based on an operation state, detects fuel pressure and controls fuel pressure to the target fuel pressure. An integration component of the feedback coefficient of the A/F ratio is corrected when at least one of the target fuel pressure and the detected fuel pressure is varied. Fuel injection amount is calculated based on the detected amount of intake air, the target A/F ratio and the feedback coefficient of the A/F ratio.

7 Claims, 7 Drawing Sheets

ENGINE CONTROL APPARATUS

BACKGROUND OF THE INVENTION

The present invention relates to an engine control apparatus, particularly to an improved engine control apparatus suitable to control accurately a ratio of air to fuel when a fuel pressure is varying.

In the prior art engine control apparatus, a ratio of air to fuel (hereinafter, abbreviated as an A/F ratio) is controlled by controlling the amount of fuel. The control of the fuel amount is performed by using a signal from an A/F ratio sensor, which is provided in an exhaust pipe for outputting a signal corresponding to a rich or lean state of the A/F ratio. The fuel amount is increased or decreased by carrying out the predetermined integration until the state of the A/F ratio changes from one to the other. Thereby, the average value of the A/F ratio of the engine is maintained at the target A/F ratio.

However, In such an A/F ratio control, there is possibility that the A/F ratio deviates temporarily from the target value when the fuel pressure is changed over.

In order to improve the above point, Japanese Patent Application Laid-Open No.6-58188 discloses such technique that the average of the A/F feedback coefficient is shifted to a lean side or rich side when the fuel pressure is changed over by a fuel pressure switching means.

However, in this prior art, the average of the A/F ratio is shifted before the operation of integration. Therefore, in case that variation of the fuel pressure continuously increases or decreases, or in case that it takes much time to change the fuel pressure because of intrinsic properties of a fuel pressure adjusting unit, there is a problem that excess corrections are made to the amount of fuel injection, and the variation of the A/F ration or the deterioration of emission is incurred.

SUMMARY OF THE INVENTION

An object of the present invention is to provide an engine control apparatus in which it is possible to suppress the disturbance of the variation of the A/F ratio due to the variation of the fuel pressure and for the A/F ratio to converge in a very short time when continuous variation of the increase and decrease of the fuel pressure occured according to an operation state is performed in the A/F control of an engine.

The above-mentioned object can be attained by providing; means for detecting the amount of an intake air, means for setting a target fuel pressure based on an operation state, means for detecting the fuel pressure, means for controlling the fuel pressure to the target fuel pressure, means for detecting the A/F ratio, means for calculating a feedback coefficient of the A/F ratio based on the deviation between the detected A/F ratio and the target A/F ratio, means for correcting the integration component of the feedback coefficient of the A/F ratio when at least one of the target fuel pressure and the detected fuel pressure is varied, and means for calculating the amount of fuel injection based on the detected amount of the intake air, the target A/F ratio and the feedback coefficient of the A/F ratio.

The variation of the fuel pressure is recognized by detecting the variation of at least one of the target fuel pressure or the detected fuel pressure. The convergence time of the A/F ratio on the target A/F ratio is cut off by varying the integration component of the feedback coefficient of the A/F ratio based on the result of recognition. As a result, the deterioration of emission can be suppressed.

Further, in case that an actual fuel pressure is varied due to the state of driving regardless of no variation of the target fuel pressure while the detected variation of the fuel pressure is recognizing, the deterioration of emission can be suppressed by cutting off the convergence time of the A/F ratio on the target A/F ratio.

Furthermore, the above-mentioned object can be attained by providing; means for detecting the amount of an intake air, means for setting a target fuel pressure based on an operation state, means for detecting the fuel pressure, means for controlling the fuel pressure to the target fuel pressure, means for detecting the A/F ratio, means for calculating a feedback coefficient of the A/F ratio based on the deviation between the detected A/F ratio and the target A/F ratio, means for correcting the integration component of the feedback coefficient of the A/F ratio based on both the target fuel pressure and the detected fuel pressure when at least one of the target fuel pressure and the detected fuel pressure is varied, and means for calculating the amount of fuel injection based on the detected amount of the intake air, the target A/F ratio and the feedback coefficient of the A/F ratio. Where, the feedback coefficient of the A/F ratio is corrected based on the difference between the target fuel pressure and the detected fuel pressure.

There are possibilities that the A/F ratio may vary at the start or end of the change-over of the fuel pressure, due to the difference in time among the target fuel pressure, the detected fuel pressure and the actual fuel pressure, occurred by a lag of operation or deterioration of a fuel pressure controlling means, a lag of the detection of the fuel pressure, a lag of the communication of a control unit, etc.. However, by recognizing the variation of the fuel pressure based on the variation of at least one of the target fuel pressure and the detected fuel pressure, and varying the integration component of the feedback coefficient of the A/F ratio based on both the target fuel pressure and the detected fuel pressure, the deterioration of emission can be avoided.

Preferably, the apparatus further includes means for calculating a correction coefficient of the fuel pressure based on the detected fuel pressure, and means for correcting the amount of fuel injection based on the correction coefficient of the fuel pressure.

Further preferably, an engine of which the control unit has the above-mentioned function is an in-cylinder injection engine in which fuel is directly injected into cylinders of the engine.

PREFERRED EMBODIMENTS OF THE INVENTION

An embodiment of the invention will be explained hereinafter with reference to the drawings.

Figure 1:
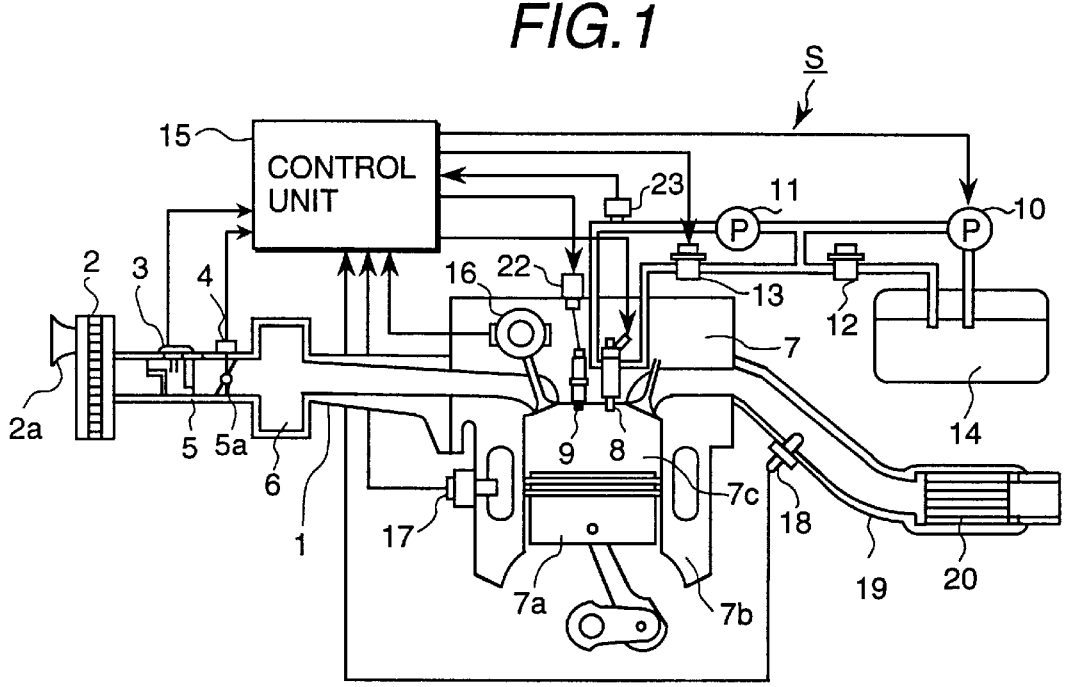
FIG. 1 is a configuration view of an engine using an engine control apparatus according to the present invention and an engine control system.
Figure 2:
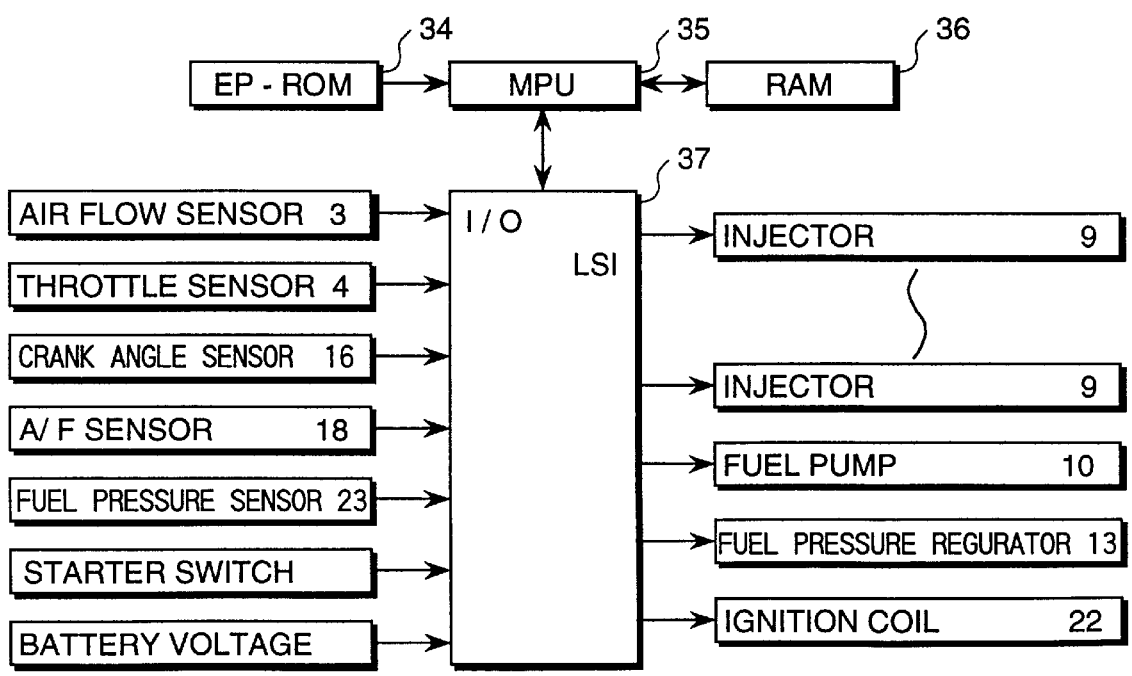
FIG. 2 is a configuration view of a control unit of the engine control apparatus shown in FIG. 1.

FIG. 1 is a configuration view of an engine 7 using an engine control apparatus according to the present invention and an engine control system S. In FIG. 1, a combustion chamber 7c configured with a piston 7a and a cylinder 7b is provided in each of cylinders of the engine 7. Further, an intake pipe 1 and an exhaust pipe 19 are connected to the upper portion of the combustion chamber 7c. An air taken into each cylinder of the engine 7 is taken from an inlet portion 2a of an air cleaner 2. The air passes through an air flow meter 3 and through a throttle body 5 incorporating a throttle valve 5a for controlling the amount of intake air, and enters into a collector 6. In the collector 6, the intake air is distributed to each intake pipe 1 connected to each cylinder 7b of the engine 7, and then taken into the inside of the cylinder 7b.

On the other hand, a primary pressure is applied to the fuel such as gasoline from a fuel tank 14 by a fuel pump 10, and then a secondary pressure is applied to the fuel. The fuel to which the secondary pressure is applied is supplied to a fuel system including an injector 9. The fuel to which the primary pressure is applied is adjusted to a predetermined pressure (ex. 0.3 MPa) by a fuel pressure regulator 12. While, the fuel to which the higher secondary pressure is applied is adjusted to a predetermined pressure (ex. 5 MPa) by a fuel pressure regulator 13. Where, the fuel pressure regulator 13 is one that can switch fuel pressures in two stages by a pressure change-over valve or vary linearly the control pressure by using an electrical signal from outside. The fuel to which the secondary pressure is applied by the fuel pressure regulator 13 is injected from the injector 9 provided to each of cylinders to the cylinder 7b.

In order to ignite the mixed air of the air and the fuel taken into the cylinder 7b, an electric current is supplied from a control unit 15 to a coil 22. When the current is cut off, a high voltage is applied to an ignition plug 8, and ignition energy is supplied to the mixed air.

Further, a catalyst 20 is provided in an exhaust pipe 19 to eliminate the harmful components of the exhaust gas.

The states of operation of the engine 7 are detected by various kinds of sensors to utilize for the control of the engine. The pressure of the fuel to which the secondary pressure is applied by the fuel pressure regulator 13 is detected by a fuel pressure sensor 23. A signal indicative of the amount of intake air is output from the air flow meter 3. Further, the opening of the throttle valve 5a is detected by a throttle sensor 4 mounted on the throttle body 5. A reference angle signal REF indicative of the position of rotation of a crank shaft and an angle signal POS for the detection of a rotational signal (rotational number) are output by a crank angle sensor 16 mounted on a cam shaft (not shown). The A/F ratio of the exhaust gas is detected by the A/F sensor 18 provided in the exhaust pipe. The detected outputs of the sensors are input to a control unit 15.

A major portion of the control unit 15 is configured with a MPU 35, a ROM 34, a RAM 36 and an I/O LSI 137 including an A/D converter. The control unit 15 inputs signals from the various kinds of sensors indicative of the states of operation of the engine 7, carries out the predetermined calculations, and outputs various kinds of control signals. As a result, the predetermined control signals are supplied to the injector 9, the fuel pressure regulator 13, the ignition coil 22, etc., and a fuel injection amount and an ignition timing are controlled.

Figure 3:
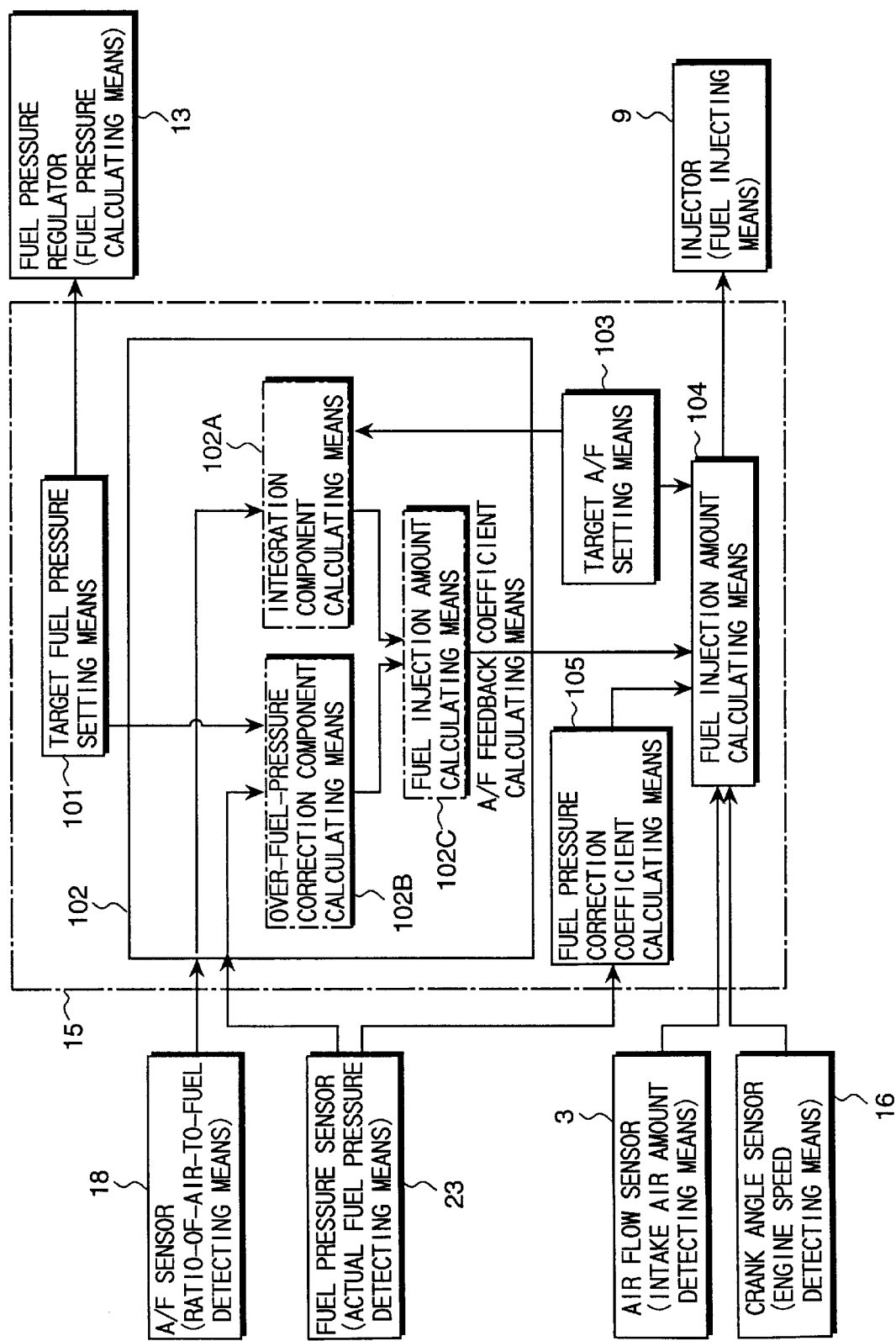
FIG. 3 is a control block diagram of the engine control apparatus shown in FIG. 1.

FIG. 3 is a control block diagram of the engine control apparatus according to the present embodiment. FIG. 3 shows the control to increase the performance of convergence in the case that the variation of the fuel pressure is controlled continuously or that it takes much time to vary the fuel pressure due to the intrinsic properties of the fuel pressure adjusting means.

A target fuel pressure is set in a target fuel pressure setting means 101, and a fuel pressure is controlled continuously or in two stages so as to match the target fuel pressure set by the target fuel pressure setting means 101. The fuel pressure varied by the fuel pressure regulator (fuel pressure adjusting means) 13 is detected by the fuel pressure sensor (actual fuel pressure detecting means) 23 connected to the injector (fuel injecting means) 9 for detecting the actual fuel pressure in a fuel pipe.

While, an A/F feedback coefficient calculating means 102 calculates the integration component of the A/F feedback coefficient from the deviation between the A/F ratio in an exhaust system of the engine 7 detected by the A/F sensor (A/F detecting means) 18 and the target A/F ratio set according to the operation state by a target A/F setting means 103.

A fuel injection amount calculating means 104 calculates the amount of fuel injection from signals indicative of the A/F feedback coefficient calculated by the A/F feedback coefficient calculating means, the target A/F ratio set by the target A/F setting means 103, the amount of intake air detected by the intake air amount sensor (intake air amount detecting means) 3, and the engine speed detected by the crank angle sensor (engine speed detecting means) 16. The calculated amount of fuel injection is injected from the injector (fuel injecting means) 9.

A fuel pressure correction coefficient calculating means 105 is one which corrects so as to become the same amount of fuel injection even if the fuel pressure is different from each other. The fuel pressure correction coefficient calculating means 105 calculates the correction coefficient of a fuel pressure based on a signal indicative of the actual fuel pressure detected by the fuel pressure sensor (actual fuel pressure detecting means) 23, and outputs it the fuel injection amount calculating means 104.

In this embodiment, the integration component of the A/F feedback coefficient calculated by an integration component calculating means 102A of the A/F feedback coefficient calculating means is corrected, when the target fuel pressure set by the target fuel pressure setting means varies, or when the detected fuel pressure detected by a fuel pressure sensor (actual fuel pressure detecting means) 23 varies. Namely, by a transient fuel pressure correction component calculating means 102B and an integration component correcting means 102C, the correction component of the integration component of the A/F feedback coefficient is calculated and its integration component is corrected.

In case that the variation of the fuel pressure is continuously controlled by the above correction, or in case that it takes much time to vary the fuel pressure due to the intrinsic properties of the fuel pressure regulator (fuel pressure adjusting means) 13, the convergence time of the A/F ratio to the target A/F ratio is shortened and the deterioration of emission is suppressed. Also in case that the actual fuel pressure is varied due to the state of operation even though the target fuel pressure is maintained, the convergence time of the A/F ratio to the target A/F ratio is shortened and the deterioration of emission is suppressed.

Figure 4:
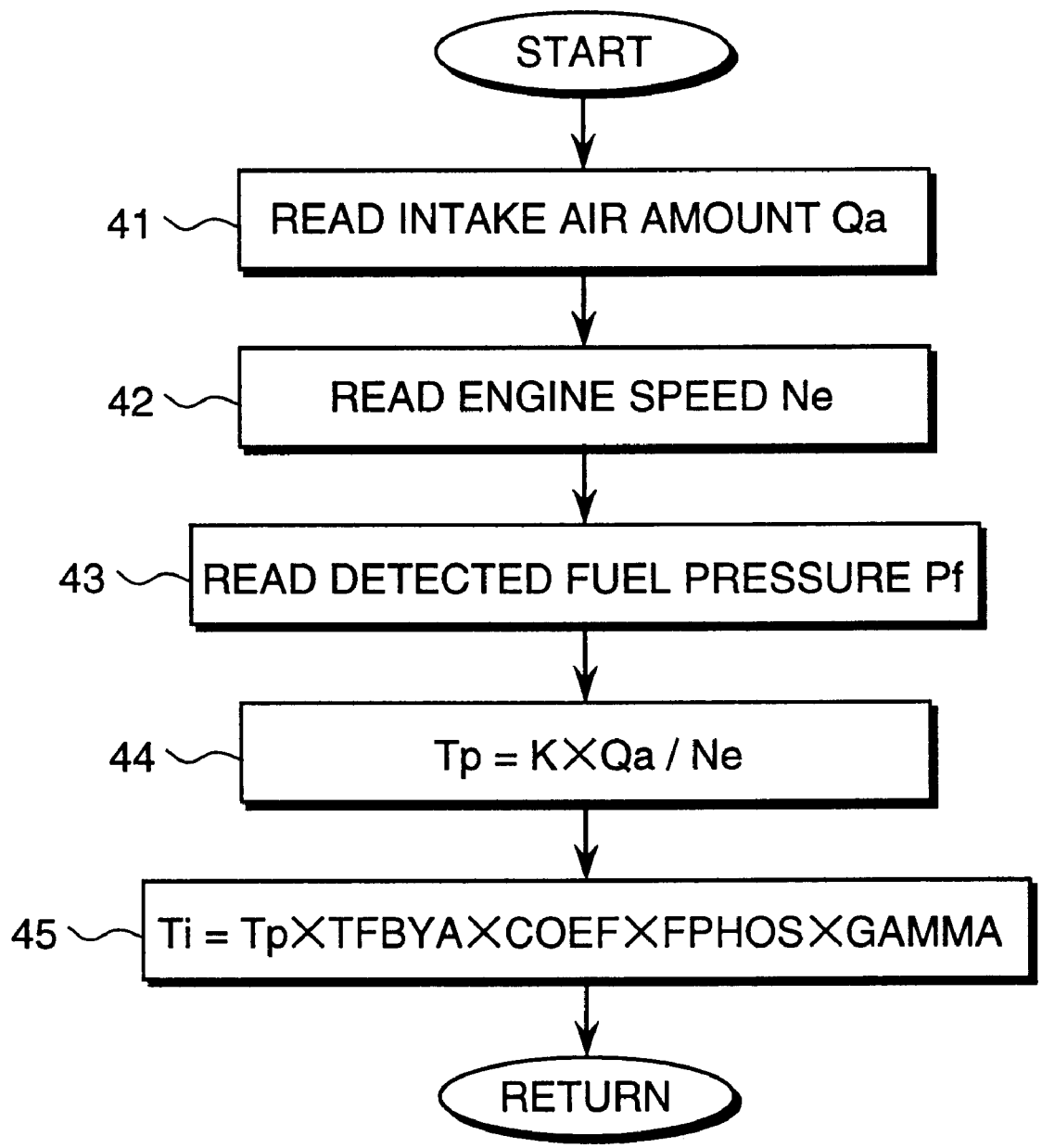
FIG. 4 is a flow chart of the calculation of the amount of fuel injection in the engine control apparatus shown in FIG. 1.

Further, when the variation of a fuel pressure is recognized by either the target fuel pressure setting means or the fuel pressure sensor (actual fuel pressure detecting means) 23 and the integration component of the A/F feedback coefficient is corrected, sometimes the A/F ratio varies at the start or the end of the change-over of the fuel pessure by the deviation in time among the target fuel pressure, the detected fuel pressure and the actual fuel pressure occurred due to delay of the operation of the fuel pressure regulator (fuel pressure adjusting means) 13, delay of the detection by the fuel pressure regulator (actual fuel pressure detecting means) 23 and delay of the communication by the control unit 15, FIG. 4 is a flow chart of the calculation of the amount of fuel injection in the engine control apparatus shown in FIG. 1. However, by correcting the A/F feedback coefficient based on both the target fuel pressure and the detected fuel pressure obtained by the target fuel pressure setting means and the fuel pressure sensor (actual fuel pressure detecting means) 23 when the fuel pressure is varied, the variations of the A/F ratio at the start and the end of the change-over of a fuel pressure are suppressed and the deterioration of emission is suppressed.

Next, the calculation of the width of a injection fuel pulse carried out in the control unit 15 (see FIG. 3) will be explained with reference to the flow chart shown in FIG. 4.

A series of processing shown in FIG. 4 is served through an interrupt every predetermined time, for example, 10 ms.

At step 41, the amount of intake air is read, at step 42, the engine speed Ne, and at step 43, the detected fuel pressure Pf or an output of the fuel pressure sensor 23. At step 44, the width Tp of a fuel injection basic pulse is calculated by the following equation (1).

$$Tp = K \times (Qa/Ne) \quad (1)$$

where, K is an injection constant of the injector set such that the ratio of the amount of the air taken into the cylinder to the amount of fuel injection may become equal to the theoretical A/F ratio 14.7 when the fuel is injected at a fuel pressure of ex. 5 Mpa.

At step 45, the width Ti of a fuel injection pulse is calculated by multiplying the width Tp of a fuel injection basic pulse by various correction coefficients, according to the following equation (2).

$$Ti = Tp \times TFBYA \times COEF \times FPHOS \times GAMMA \quad (2)$$

where, TFBYA is a correction coefficient set such that the ratio of the amount of the air taken into the cylinder to the amount of fuel injection may become equal to the target A/F ratio. The target A/F ratio can be obtained, for example, from a target A/F map of which one axis is the width Tp of a fuel injection basic pulse and the other axis is the engine speed Ne. COEF is a correction coefficient which acts according to the state of operation such as a transient state or a post-start state. FPOHS is a correction coefficient of a fuel pressure for correcting such that the amount of fuel injection may become the same even though the fuel pressures are different. If the width of the fuel injection pulses are the same, the higher the fuel pressure becomes, the more the amount of fuel injection does, and the lower the fuel pressure becomes, the less the amount of fuel injection does. Therefore, if the injector injection constant K is set at the fuel pressure of 5 MPa, the correction coefficient FPHOS of a fuel pressure is set to 1.0 when the detected fuel pressure Pf is 5 MPa. If the detected fuel pressure Pf becomes less than 5 MPa, FPHOS is set to more than 1.0 according to the magnitude of the detected fuel pressure and as the detected fuel pressure Pf becomes more than 5 MPa, FPHOS is set to less than 1.0 according to the magnitude of the detected fuel pressure Pf. This FPHOS can be obtained, for example, by referring a table. Further, it is possible to apply this embodiment to the calculation of the amount of fuel injection carried out without using FPHOS. GAMMA is an A/F feedback coefficient.

Figure 5:
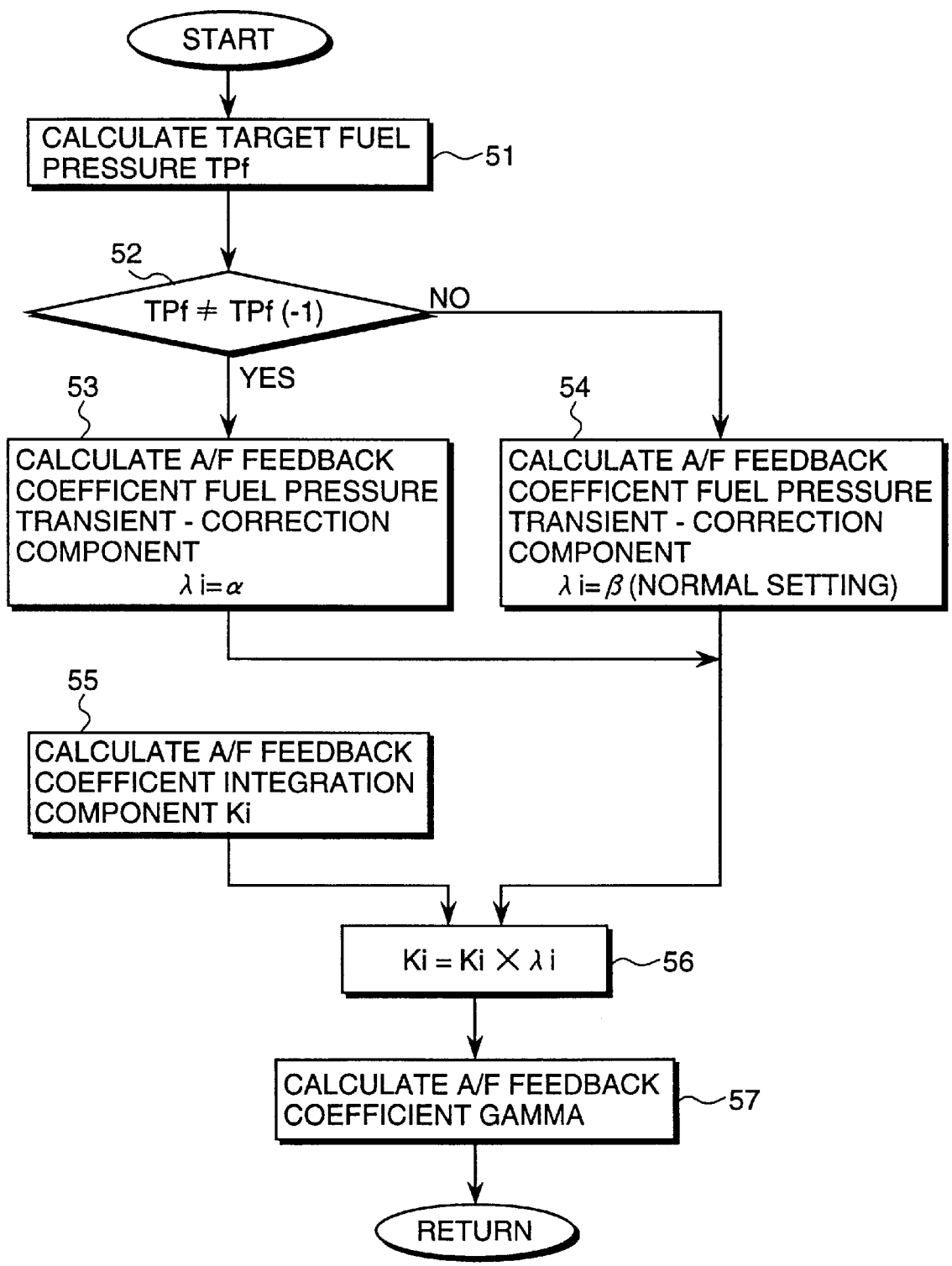
FIG. 5 is a flow chart of the control of A/F ratio in the engine control apparatus shown in FIG. 1, in which the variation of a target fuel pressure is utilized for the control.

FIG. 5 is a flow chart of the calculation of the A/F feedback coefficient in case that the variation of a fuel pressure is recognized by the variation of the target fuel pressure TPf.

At step 51, the target fuel pressure TPf is read or calculated. The calculation of the target fuel pressure TPf at step 51 is carried out based on the state of operation. For example, the calculation can be performed by using a map of which one axis is the width Tp of a fuel injection basic pulse and the other axis is the engine speed Ne, or by using a table of which one axis is the width Ti of a fuel injection pulse and the other axis is an A/F ratio.

Next, at step 52, the current target fuel pressure TPf is compared with the target fuel pressure TPf obtained in one job ahead. If the target fuel pressure TPf have been varied, then the process advances to step 53. Otherwise, the process advances to step 54. At steps 51 and 52, it is possible to use the detected fuel pressure Pf instead of the target fuel pressure TPf. If the target fuel pressure TPf is varying, it is determined that the fuel pressure is in a transient state, and the transient fuel pressure correction component $\lambda$ i of the A/F feedback coefficient is set to a value $\alpha$ more than the normal value at step 53. The setting of the transient fuel pressure correction component $\lambda$ i of the A/F feedback coefficient at step 53 is performed by using a table or map of which the axes are the amount of the variation of a fuel pressure and the change-over time of a fuel pressure.

While, at step 54, it is determined that the fuel pressure is in a steady state, and the transient fuel pressure correction component $\lambda$ i of the A/F feedback coefficient is set to the normal setting value $\beta$.

At step 56, the integration component Ki of the A/F feedback coefficient set at step 55 is corrected by using the transient fuel pressure correction component $\lambda$ i of the A/F feedback coefficient set at steps 53 and 54. At step 57, the A/F feedback coefficient GAMMA is calculated by using the integration component Ki of the A/F feedback coefficient corrected at step 56.

Figure 6:
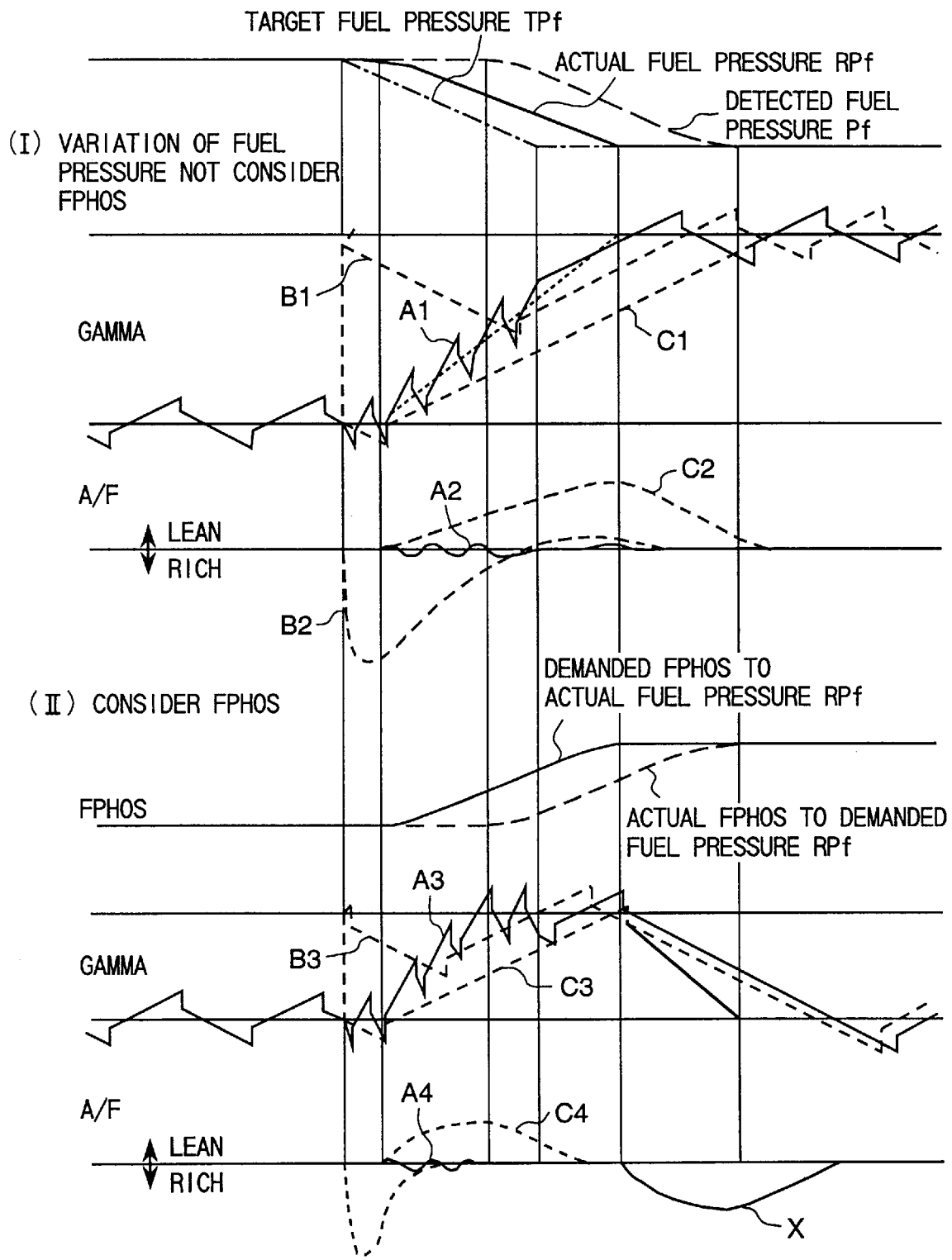
FIG. 6 is a view showing a state of the function of the A/F ratio control of FIG. 5.

FIG. 6 shows the behavior of the A/F ratio in case that the processing shown in FIG. 5 is performed when the fuel pressure is dropped.

Assumed that the actual fuel pressure at the time when a fuel is injected from the injector 9 is RPf, the relationship, large and small, of the fuel pressure at the time when the drop of the fuel pressure is in a transient state becomes as follows, due to delay of the operation of the fuel pressure regulator (fuel pressure adjusting means) 13, delay of the detection by the fuel pressure regulator (actual fuel pressure detecting means) 23 and delay of the communication by the control unit 15.

$$TPf < RPf < Pf$$

In case of the control in which the correction coefficient FPHOS of the fuel pressure is not considered in the equation (2) (see (I) of FIG. 6), the amount of the fuel injection which is decreasing due to the drop of the fuel pressure is corrected by increasing the A/F feedback coefficient. As a result, it is prevented for the A/F ratio to become lean. If the average value of the A/F feedback coefficient is shifted to the rich side at the start of the drop of the fuel pressure in order to suppress the lean of the A/F ratio, there is the possibility that the width of the fuel injection pulse is over-corrected to the rich side at the start of the drop of the fuel pressure and the hunching of the A/F ratio is occurred (see dotted lines B1, B2 of (I) of FIG. 6). Further, if the A/F feedback control is performed by a constant integration component of the A/F ratio feedback coefficient, the A/F feedback control can not follow the decrease of the fuel amount due to the drop of the fuel pressure and the A/F ratio becomes lean. As a result, the convergence to the target A/F ratio is deteriorated (see dotted lines C1, C2 of (I) of FIG. 6). on the other hand, if the integration component of the A/F feedback coefficient is increased when the drop of the fuel pressure is in a transient state, the hunting or lean of the A/F ratio is suppressed. As a result, the convergence to the target A/F ratio is improved (see solid lines A1, A2 of (I) of FIG. 6). because the variation of the A/F ratio is suppressed, it is possible to prevent the deterioration of the emission or operation.

In case of the control in which the correction coefficient FPHOS of the fuel pressure is considered in the equation (2) (see (II) of FIG. 6), the decrease of the amount of the fuel injection due to the drop of the fuel pressure is not occurred on the equation (2). However, in fact, the shortage of the amount of fuel injection is occurred and thus the A/F ratio becomes lean, because the detected fuel pressure Pf becomes higher than the actual fuel pressure RPf due to the difference in time between the actual fuel pressure RPf and the detected fuel pressure Pf. If the average value of the A/F feedback coefficient is shifted to the rich side at the start of the drop of the fuel pressure in order to suppress the lean A/F ratio, there is the possibility that the width of the fuel injection pulse is over-corrected to the rich side at the start of the drop of the fuel pressure and the hunting of the A/F ratio is occurred (see dotted lines B3, B4 of (II) of FIG. 6). Further, if the A/F feedback control is performed by a constant integration component of the A/F ratio feedback coefficient, the A/F feedback control can not follow the decrease of the fuel amount due to the drop of the fuel pressure and the A/F ratio becomes lean. As a result, the convergence to the target A/F ratio is deteriorated (see dotted lines C3, C4 of (II) of FIG. 6). On the other hand, if the integration component of the A/F feedback coefficient is increased when the drop of the fuel pressure is in a transient state, the hunting or lean state of the A/F ratio is suppressed. As a result, the convergence to the target A/F ratio is improved (see solid lines A3, A4 of (II) of FIG. 6). Because the variation of the A/F ratio is suppressed, it is possible to prevent the deterioration of the emission or operation.

In case of the control in which the correction coefficient FPHOS of the fuel pressure is considered in the equation (2) (see (II) of FIG. 6), the A/F ratio becomes rich at the end of the variation of the actual fuel pressure RPf (see a solid line X of FIG. 6). A method of preventing such a rich state of the A/F ratio will be explained hereinafter.

Figure 7:
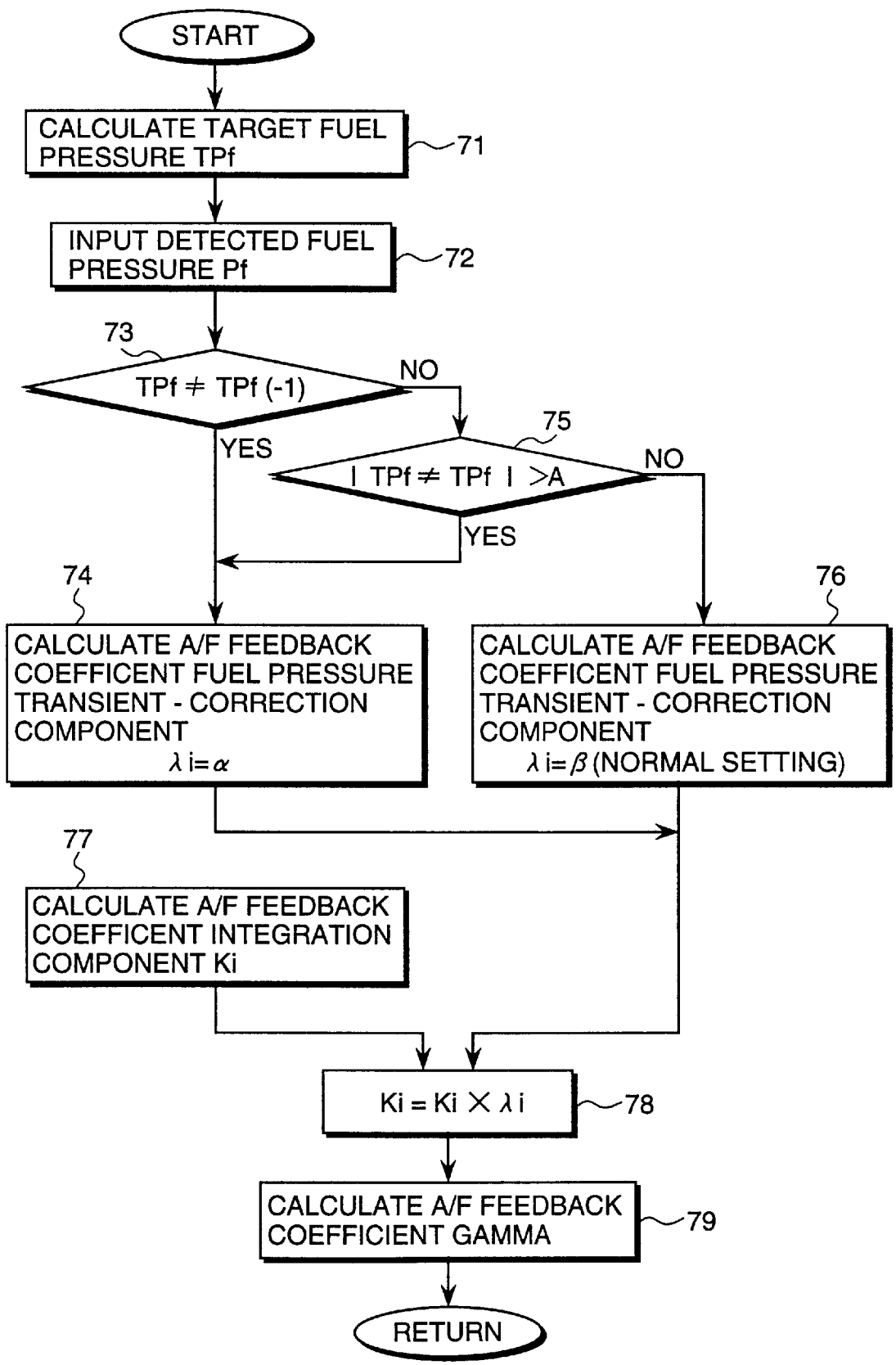
FIG. 7 is a flow chart of the control of A/F ratio in the engine control apparatus shown in FIG. 1, in which the variation of the target fuel pressure and the detected fuel pressure are utilized for the control.

FIG. 7 is a flow chart of the control of A/F ratio, for preventing the above rich state of the A/F ratio.

At step 71, the target fuel pressure TPf is calculated. At step 72, the detected fuel pressure Pf, an output of the fuel pressure sensor 23, is read and then the processing advances to step 73.

Next, at step 73, the current target fuel pressure TPf is compared with the target fuel pressure TPf obtained in one job ahead. If the target fuel pressure TPf has been varied, then the processing advances to step 74. Otherwise, the processing advances to step 75. At step 75, if the deviation between the target fuel pressure TPf and the detected fuel pressure Pf is more than the specific value A, then the processing advances to step 74. If the deviation between the target fuel pressure TPf and the detected fuel pressure Pf is less than the specific value A, then the processing advances to step 76.

It should be appreciated that the determination at step 75 may change as follows. In case that the detected fuel pressure Pf varies while the target fuel pressure TPf is varying, namely, the variation of the target fuel pressure TPf and the variation of the detected fuel pressure Pf are overlapped, in other words, in case that the change-over time of the fuel pressure is set to be longer, at step 75, the current target fuel pressure Pf is compared with the target fuel pressure Pf obtained in one job ahead. If the target fuel pressure Pf has been varied, then the processing advances to step 74. Otherwise, the processing branches to step 76.

At step 74, it is determined that the fuel pressure is in a transient state, and the transient fuel pressure correction component $\lambda$ i of the A/F feedback coefficient is set to a value $\alpha$ more than the normal value. The setting of the transient fuel pressure correction component $\lambda$ i of the A/F feedback coefficient at step 74 is performed by using a table or map of which the axes are the amount of the variation of a fuel pressure and the change-over time of a fuel pressure, or by using a table of which the axis is the deviation between the target fuel pressure TPf and the detected fuel pressure Pf.

While, at step 76, it is determined that the fuel pressure is in a steady state, and the transient fuel pressure correction component $\lambda$ i of the A/F feedback coefficient is set to the normal setting value $\beta$.

At step 78, the integration component Ki of the A/F feedback coefficient set at step 77 is corrected by using the transient fuel pressure correction component $\lambda$ i of the A/F feedback coefficient set at steps 74 and 76. At step 79, the A/F feedback coefficient GAMMA is calculated by using the integration component Ki of the A/F feedback coefficient corrected at step 78.

Figure 8:
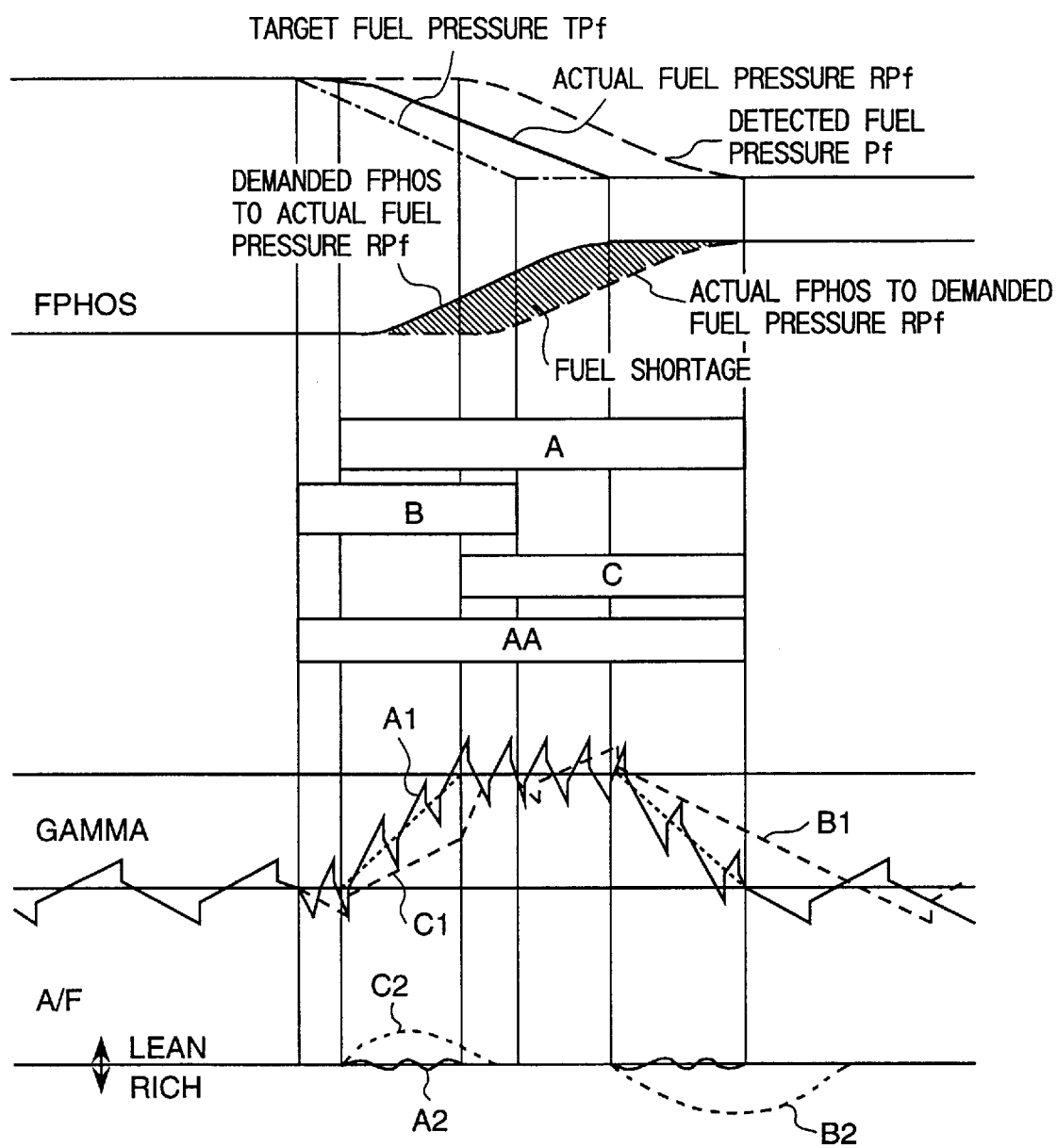
FIG. 8 is a view showing the function of the A/F ratio control of FIG. 7.

FIG. 8 shows the behavior of the A/F ratio in case that the processing shown in the flow chart of FIG. 7 is performed when the fuel pressure is dropped.

Because the detected fuel pressure Pf becomes higher than the actual fuel pressure RPf due to the delay in time between the detected fuel pressure Pf and the actual fuel pressure RPf when the drop of the fuel pressure is in a transient state, the correction coefficient FPHOS of the fuel pressure calculated based on the detected fuel pressure Pf becomes small the correction coefficient FPHOS of the fuel pressure required according to the actual fuel pressure RPf. As a result, the shortage of the amount of fuel injection is occurred. In case that the shortage of the amount of fuel injection is compensated by using the A/F feedback, it is possible to suppress the variation of the A/F ratio by increasing the integration component of the A/F feedback coefficient (at a section A) while the actual fuel pressure RPf and the detected fuel pressure Pf is different. If the integration component of the A/F feedback coefficient is increased (at a section B) while the target fuel pressure is varying, the A/F ratio can not follow at the end of the variation of the fuel pressure and thus the A/F ratio becomes rich (see dotted lines B1, B2 of FIG. 8). Further, if the integration component of the A/F feedback coefficient is increased (at a section C) while the detected fuel pressure is varying, the A/F ratio can not follow at the start of the variation of the fuel pressure and thus the A/F ratio becomes lean (see dotted lines C1, C2 of FIG. 8).

As described above, in a method of varying the A/F feedback coefficient based on the variation of either the target fuel pressure TPf or the detected fuel pressure Pf, the A/F ratio is varied at the start or the end of the variation of the fuel pressure. While, in case that either the target fuel pressure TPf is varying or the deviation between the target fuel pressure TPf and the detected fuel pressure Pf is more than the predetermined value (section AA), in a method shown in the flow chart of FIG. 7, for increasing the integration component of the A/F feedback coefficient, the A/F ratio can follow at both the start and the end of the variation of the fuel pressure. Therefore, the variation of the A/F ratio can be suppressed (see solid lines A1, A2 of FIG. 8). While the correction coefficient FPHOS of the fuel pressure is considered in this embodiment, it is possible to obtain the same effect as FIG. 8 without the consideration of the correction coefficient FPHOS.

in the control in which the detected fuel pressure Pf is used for the determination at step 52 of the flow chart of FIG. 5, or in the control shown in FIG. 7, the target fuel pressure TPf is not varied. Therefore, in case that the actual fuel pressure RPf and the detected fuel pressure Pf are varied according to the state of operation, the convergence time of the A/F ratio to the target A/F ratio can be shortened, and the deterioration of the emission can be suppressed.

While the described embodiment represents the preferred form of the present invention, it is to be understood that changes and variations may be made without departing from the spirit of the invention.

As is understood from the above description, in case that the variation of the fuel pressure is continuously controlled by the above correction, or in case that it takes much time to vary the fuel pressure due to the intrinsic properties of the fuel pressure regulator (fuel pressure adjusting means) 13, the convergence time of the A/F ratio to the target A/F ratio is shortened and the deterioration of the emission is suppressed.

Further, while the A/F ratio varies at the start or the end of the change-over of the fuel pressure, by the difference in time among the target fuel pressure, the detected fuel pressure and the actual fuel pressure occurred due to delay of the operation of the fuel pressure regulator, delay of the detection by the fuel pressure regulator and delay of the communication by the control unit, when the variation of a fuel pressure is recognized by either the target fuel pressure setting means or the fuel pressure sensor, By correcting the A/F feedback coefficient based on both the target fuel pressure and the detected fuel pressure obtained by the target fuel pressure setting means and the fuel pressure sensor when the fuel pressure is varied, the variations of the A/F ratio at both the start and the end of the change-over of a fuel pressure are suppressed and the deterioration of the emission is suppressed.

Also in case that the actual fuel pressure is varied due to the state of operation even though the target fuel pressure is maintained, the convergence time of the A/F ratio to the target A/F ratio is shortened and the deterioration of the emission is suppressed.

What is claimed is:

1. An engine control apparatus comprising; means for detecting the amount of an intake air, means for setting a target fuel pressure based on an operation state, means for detecting the fuel pressure, means for controlling the fuel pressure to the target fuel pressure, means for detecting the A/F ratio, means for calculating a feedback coefficient of the A/F ratio, means for correcting the integration component of the feedback component of the A/F ratio when at least one of the target fuel pressure and the detected fuel pressure is varied, and means for calculating the amount of the fuel injection based on the detected amount of the intake air, the target A/F ratio and the feedback coefficient of the A/F ratio.

2. An engine control apparatus comprising; means for detecting the amount of an intake air, means for setting a target fuel pressure based on an operation state, means for detecting the fuel pressure, means for controlling the fuel pressure to the target fuel pressure means for detecting the A/F ratio, means for calculating a feedback coefficient of the A/F ratio, means for correcting the integration component of the feedback component of the A/F ratio when the target fuel pressure is varied, and means for calculating the amount of the fuel injection based on the detected amount of the intake air, the target A/F ratio and the feedback coefficient of the A/F ratio.

3. An engine control apparatus comprising; means for detecting the amount of an intake air, means for setting a target fuel pressure based on an operation state, means for detecting the fuel pressure, means for controlling the fuel pressure to the target fuel pressure, means for detecting the A/F ratio, means for calculating a feedback coefficient of the A/F ratio, means for correcting the integration component of the feedback component of the A/F ratio when the detected fuel pressure is varied, and means for calculating the amount of the fuel injection based on the detected amount of the intake air, the target A/F ratio and the feedback coefficient of the A/F ratio.

4. An engine control apparatus comprising; means for detecting the amount of an intake air, means for setting a target fuel pressure based on an operation state, means for detecting the fuel pressure, means for controlling the fuel pressure to the target fuel pressure, means for detecting the A/F ratio, means for calculating a feedback coefficient of the A/F ratio, means for correcting the integration component of the feedback component of the A/F ratio based on both the target fuel pressure and the detected fuel pressure when at least one of the target fuel pressure and the detected fuel pressure is varied, and means for calculating the amount of the fuel injection based on the detected amount of the intake air, the target A/F ratio and the feedback coefficient of the A/F ratio.

5. An engine control apparatus comprising; means for detecting the amount of an intake air, means for setting a target fuel pressure based on an operation state, means for detecting the fuel pressure, means for controlling the fuel pressure to the target fuel pressure, means for detecting the A/F ratio, means for calculating a feedback coefficient of the A/F ratio, means for correcting the integration component of the feedback component of the A/F ratio based on the difference between the target fuel pressure and the detected fuel pressure when at least one of the target fuel pressure and the detected fuel pressure is varied, and means for calculating the amount of the fuel injection based on the detected amount of the intake air, the target A/F ratio and the feedback coefficient of the A/F ratio.

6. An engine control apparatus comprising; means for detecting the amount of an intake air, means for setting a target fuel pressure based on an operation state, means for detecting the fuel pressure, means for calculating a correction coefficient for the fuel pressure based on the detected fuel pressure, means for controlling the fuel pressure to the target fuel pressure, means for detecting the A/F ratio, means for calculating a feedback coefficient of the A/F ratio based on the deviation between the detected A/F ratio and the target A/F ratio, means for correcting the integration component of the feedback component of the A/F ratio based on both the target fuel pressure and the detected fuel pressure when at least one of the target fuel pressure and the detected fuel pressure is varied, and means for calculating the amount of the fuel injection based on the detected amount of the intake air, the target A/F ratio, the feedback coefficient of the A/F ratio and the correction coefficient for the fuel pressure.

7. An in-cylinder injection engine in which fuel is directly injected into cylinders of the engine, controlled by the engine control apparatus according to claim 1.

* * * * *